US010482294B2

(12) United States Patent
Watanabe

(10) Patent No.: US 10,482,294 B2
(45) Date of Patent: Nov. 19, 2019

(54) INFORMATION PROCESSING APPARATUS, INFORMATION COLLECTING APPARATUS, AND INFORMATION COLLECTING SYSTEM

(71) Applicant: TOSHIBA TEC KABUSHIKI KAISHA, Tokyo (JP)

(72) Inventor: Koichi Watanabe, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/902,631

(22) Filed: Feb. 22, 2018

(65) Prior Publication Data

US 2018/0276435 A1 Sep. 27, 2018

(30) Foreign Application Priority Data

Mar. 21, 2017 (JP) ................................. 2017-054703

(51) Int. Cl.
| | |
|---|---|
| *G06K 7/10* | (2006.01) |
| *B62B 5/00* | (2006.01) |
| *G06Q 10/08* | (2012.01) |
| *G06Q 50/28* | (2012.01) |

(52) U.S. Cl.
CPC ........ *G06K 7/10425* (2013.01); *B62B 5/0026* (2013.01); *G06Q 10/087* (2013.01); *G06Q 10/0833* (2013.01); *G06Q 50/28* (2013.01)

(58) Field of Classification Search
CPC ............. G06K 7/10376; G06K 7/10425; B25J 13/086; G06Q 10/08
See application file for complete search history.

(56) References Cited

U.S. PATENT DOCUMENTS

2017/0225336 A1* 8/2017 Deyle .................... B25J 13/086

FOREIGN PATENT DOCUMENTS

JP 2005-320074 A 11/2005

\* cited by examiner

*Primary Examiner* — Hongmin Fan
(74) *Attorney, Agent, or Firm* — Kim & Stewart LLP

(57) ABSTRACT

According to one embodiment, an information collecting apparatus includes a plurality of tag readers disposed on a mobile apparatus, each respective tag reader being configured to detect a wireless tag attached to an article that is within a detection range of the respective tag reader, a movement controller configured to control movement of the mobile apparatus within a search area along a plurality of routes, each route enclosing a different segment region of the search area, and a data processor configured to acquire tag detection information of the wireless tag during a time in which the mobile apparatus is moving in a particular route enclosing each segment region, aggregate the number of times for which the wireless tag is detected, and identify a particular segment region in which the wireless tag is present based on the aggregated number of times for which the wireless tag is detected.

12 Claims, 11 Drawing Sheets

FIG. 11

| ID | AREA |
|---|---|
| 00001 | 2 |
| 00002 | 5 |
| 00003 | 3 |
| ... | ... |

INFORMATION PROCESSING APPARATUS, INFORMATION COLLECTING APPARATUS, AND INFORMATION COLLECTING SYSTEM

CROSS-REFERENCE TO RELATED APPLICATION

This application is based upon and claims the benefit of priority from Japanese Patent Application No. 2017-054703, filed in Mar. 21, 2017, the entire contents of which are incorporated herein by reference.

FIELD

Embodiments described herein relate generally to an information processing apparatus, an information collecting apparatus, and an information collecting system.

BACKGROUND

In the related art, there is an inventory management system which uses RFID (Radio-Frequency Identification) tags for tracking individual articles such as commercial goods, books, or documents. The RFID tag attached to an article stores information, such as an identification number (ID) uniquely assigned to the article, which can be read by an RFID tag reader. When the RFID tag reader simultaneously reads information from a plurality of RFID tags attached to articles spread over a wide area, it may be necessary to identify a position or an area where each article is located. In the related art, there is a technique for detecting a distance and direction of the RFID tag from the RFID tag reader based on an intensity of radio waves received from the RFID tag by a directional antenna. However, in general, the intensity of the radio waves received from the RFID tag depends not only on its distance from the RFID tag reader but also on the RFID tag's relative orientation. For this reason, if the RFID tags on the articles are not arranged in a fixed orientation, it becomes difficult to accurately detect a distance from the RFID tag reader based on the intensity of the radio waves received through the antenna.

DESCRIPTION OF THE DRAWINGS

FIG. 11 is a table illustrating an example of the result of the region estimation processing by the information collecting system.

DETAILED DESCRIPTION

According to an embodiment, an information collecting apparatus includes a plurality of tag readers disposed on a mobile apparatus, each respective tag reader being configured to detect a wireless tag attached to an article located within a detection range of the respective tag reader, a movement controller configured to control movement of the mobile apparatus within a search area along a plurality of routes, each route enclosing a different segment region of the search area, and a data processor configured to acquire tag detection information of the wireless tag during a time in which the mobile apparatus is moving in a particular route enclosing each segment region, aggregate the number of times for which the wireless tag is detected, and identify a particular segment region in which the wireless tag is present based on the aggregated number of times for which the wireless tag is detected.

Hereinafter, an embodiment is described with reference to the accompanying drawings.

First, an operation of an information collecting system including an information collecting apparatus and an information processing apparatus according to the present embodiment is described. The information collecting system according to the present embodiment identifies a region, e.g., a segment region or a search segment region, in which a particular article is located within a predetermined search area in which a plurality of articles is known to be arranged. The information collecting apparatus collects information for identifying a region within the search area, such as a shelf, on which an article is located. The information processing apparatus identifies the region on which the article is located based on the information collected by the information collecting apparatus.

Figure 1:
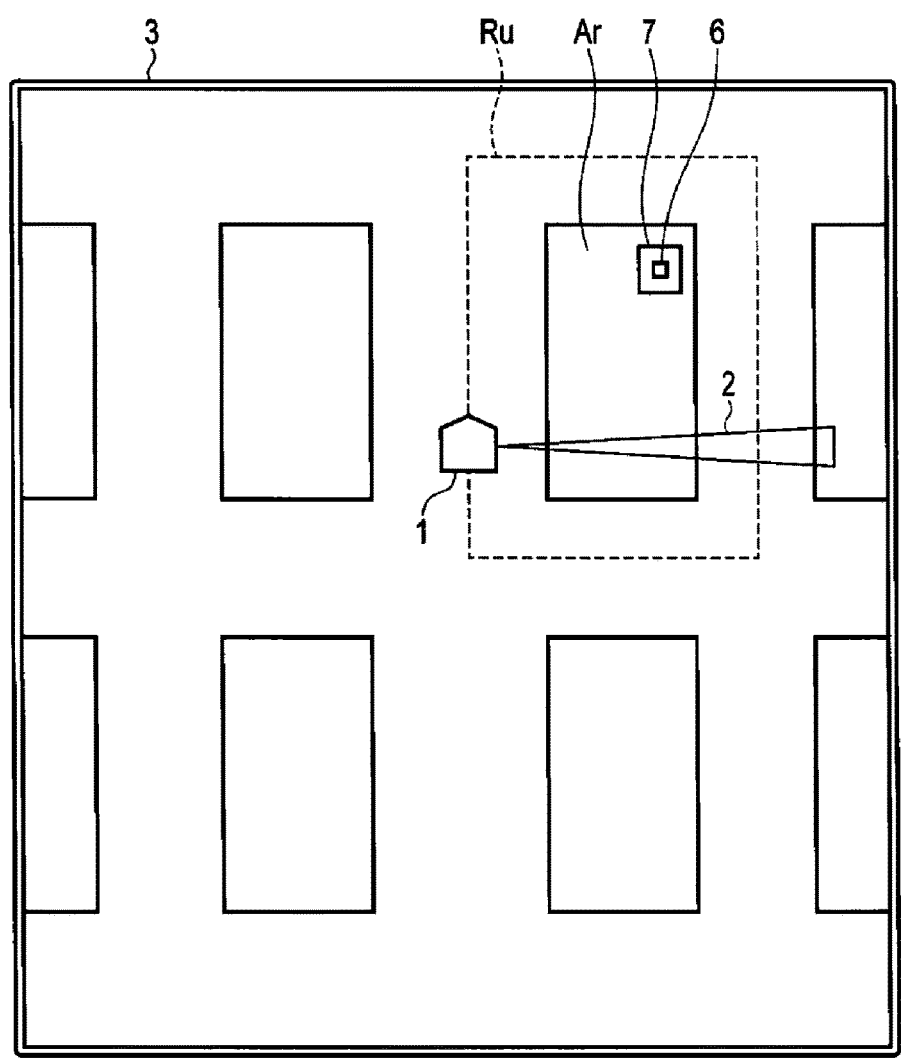
FIG. 1 is a view illustrating an example of a search area in which an article to be searched by an information collecting system according to an embodiment is arranged.
Figure 2:
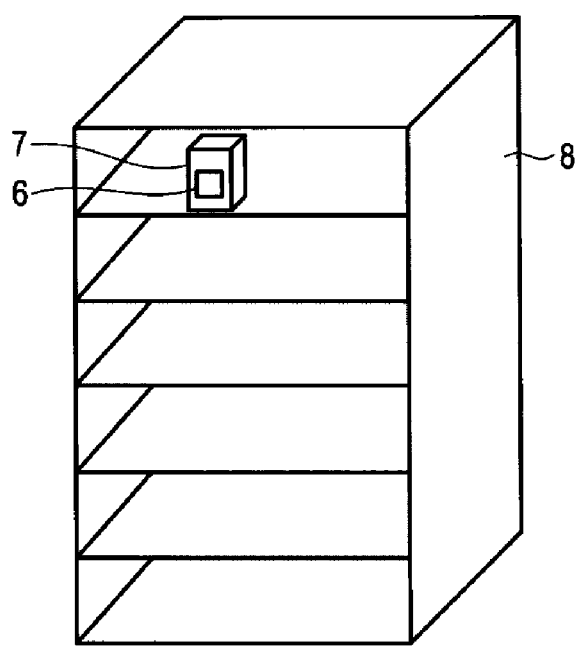
FIG. 2 is a view illustrating an example of arrangement of an article to be searched by the information collecting system.

FIG. 1 is a view illustrating the search area in which an article to be searched for by the information collecting system according to the present embodiment is disposed. FIG. 2 is a view illustrating an arrangement of an article to be searched for by the information collecting system.

In FIG. 1, an information collecting apparatus 1 is arranged so that an article within a detection range 2 can be detected along a specific direction. In the present embodiment, the detection range 2 is a range within which an RFID tag reader (hereinafter referred to simply as a tag reader) can detect an RFID tag (hereinafter referred to simply as a tag, also referred to as a wireless tag) attached to the article. The information collecting apparatus 1 is equipped with the tag reader. In the information collecting apparatus 1, it is set that the range within which the tag reader can detect the tag is equal to the detection range 2. For example, the detection range 2 is designed according to the characteristics of a directional antenna of the tag reader.

The information collecting apparatus 1 collects information for detecting articles in a search area surrounded by a wall 3. The information collecting apparatus 1 can move within this search area. The search area comprises a plurality of segment regions Ar, each of which is a unit region in which presence or absence of an article to which the tag is attached is detected. In each segment region Ar, an article 7 to which a tag 6 is attached is arranged. For example, as shown in FIG. 2, each segment region Ar is a shelf on which articles 7 to which tags 6 are respectively attached are arranged (one article is shown in FIG. 2).

The information collecting apparatus 1 moves around each segment region Ar along a movement route Ru. The movement route Ru is set so that the detection range 2 of the information collecting apparatus 1 can cover the entire segment region Ar. The movement route Ru is formed by combining a plurality of route sections in specific moving directions. In FIG. 1, the movement route Ru includes four movement sections in four different directions with which each segment region Ar is enclosed in a rectangular shape.

Figure 3:
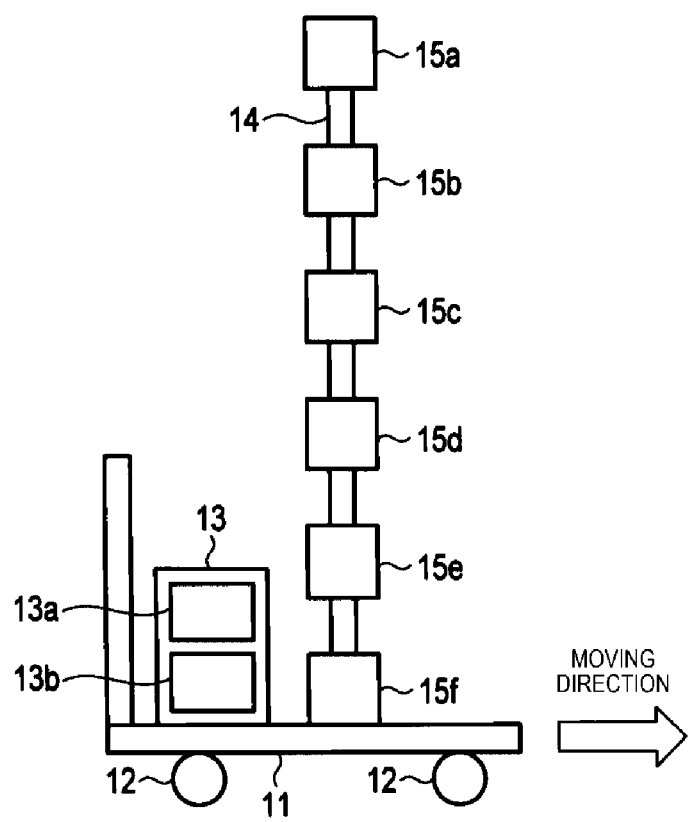
FIG. 3 is an external view illustrating an example of constitution of an information collecting apparatus.
Figure 4:
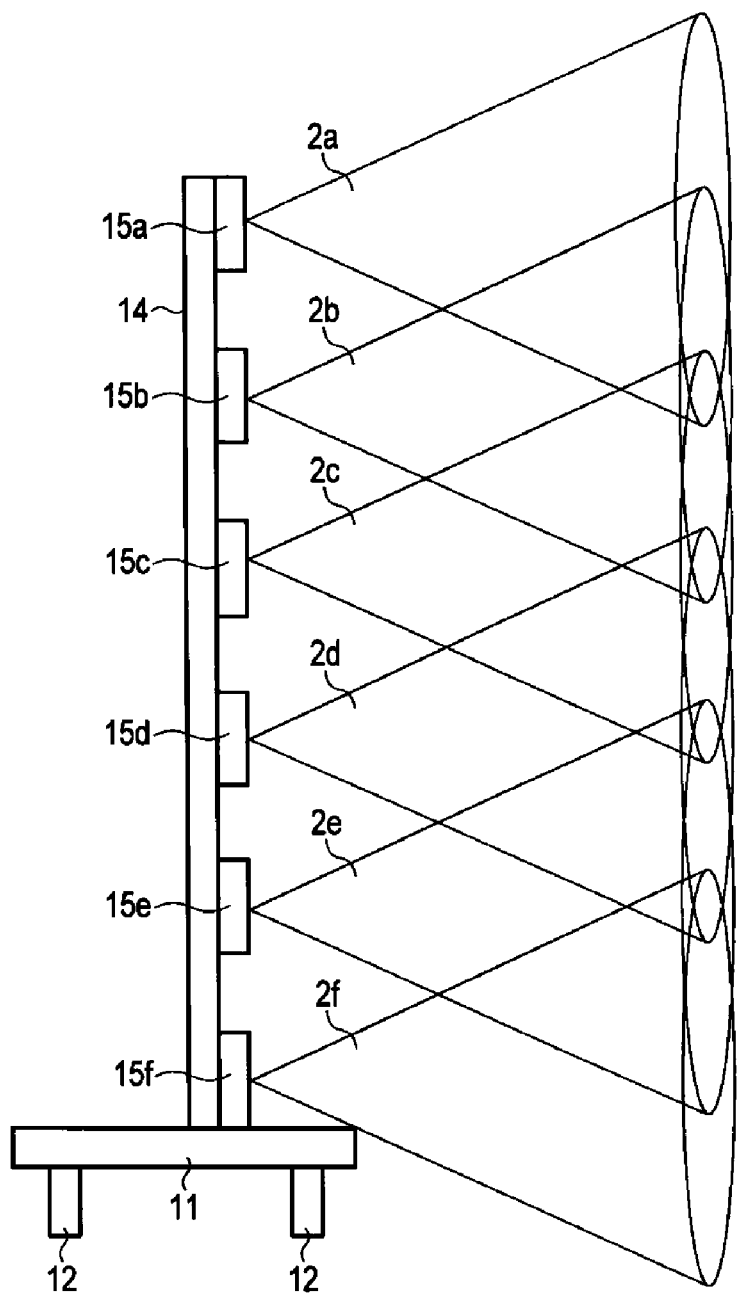
FIG. 4 is a view illustrating an example of a detection range of the information collecting apparatus.

FIG. 3 is a view illustrating constitution of the information collecting apparatus 1. FIG. 4 is a view illustrating the detection range 2. As shown in FIG. 3, the information collecting apparatus 1 includes a case body (main body) 11, wheels 12, a control device 13, a support body 14, and a plurality of tag readers 15 (15a, 15b, . . . 15f, if each tag reader is referred to).

The wheels 12 and the support body 14 are assembled to the case body 11, and the control device 13 is mounted on the case body 11. The wheels 12 rotate by a moving mechanism to move the case body 11 in a moving direction indicated by an arrow in FIG. 3. In the present embodiment, the case body 11 moves along the movement route Ru surrounding the segment region Ar and thus the case body 11 is provided with a mechanism (not shown) for changing moving directions. The mechanism for changing the moving direction of the case body 11 may be provided on the wheels 12 or may be provided separately from the wheels 12.

The control device 13 includes a data processing device 13a and a movement control device 13b. The data processing device 13a performs, for example, communication with the tag via the tag reader 15, processing of data received from the tag, transmission/reception of data to or from a host device, and the like. The movement control device 13b controls the movement of the information collecting apparatus 1. The data processing device 13a and the movement control device 13b are each implemented by, for example, a computer. Both of the data processing device 13a and the movement control device 13b may be implemented by one computer.

In the present embodiment, the information collecting apparatus 1 is an autonomous or self-traveling type apparatus in which the internal control device 13 controls movement of the case body 11 in the moving direction and a change of the moving directions. However, the information collecting apparatus 1 is not limited to an autonomous type, but may be any type of the apparatus that can move along the movement route Ru. For example, the information collecting apparatus may be a device mounted on a carriage that is manually moved or may be a portable device that a person can move while holding the device in his/her hand.

The support body 14 is attached to the case body 11. The tag readers 15 are attached to the support body 14. The tag reader 15 is a device that can wirelessly communicate with a tag attached to an article to read identification information (ID) of the tag via radio waves transmitted from the tag. Each tag reader 15 includes a communication antenna and a communication control unit. The detection range (communication range) 2 of the tag reader 15, within which radio waves can be transmitted and received, is determined based on the characteristics of the communication antenna and the installation orientation of the communication antenna. In the present embodiment, the tag reader 15 is equipped with a directional antenna, which determines the communication range of the tag reader 15 as a detection range of the tag.

In FIGS. 3 and 4, a plurality of tag readers 15 is mounted on the support body 14 in a row along a vertical direction. The tag readers 15 are attached to the support body 14 so that the detection ranges 2a, 2b, . . . , and, 2f form the detection range 2 of the information collecting apparatus 1 as a whole. In FIG. 4, each tag reader 15 is mounted in a row in the vertical direction as described above. Therefore, the detection range 2 as a whole is wider than the individual detection range 2a to 2f in the vertical direction. The tag readers 15 can be installed at a position with a direction such that the information collecting apparatus 1 has the detection range with an appropriate size and location. In the present embodiment, the detection range 2 of each tag reader 15a to 15f is at the right side with respect to the moving direction of the case body 11 shown in FIG. 3.

Figure 5:
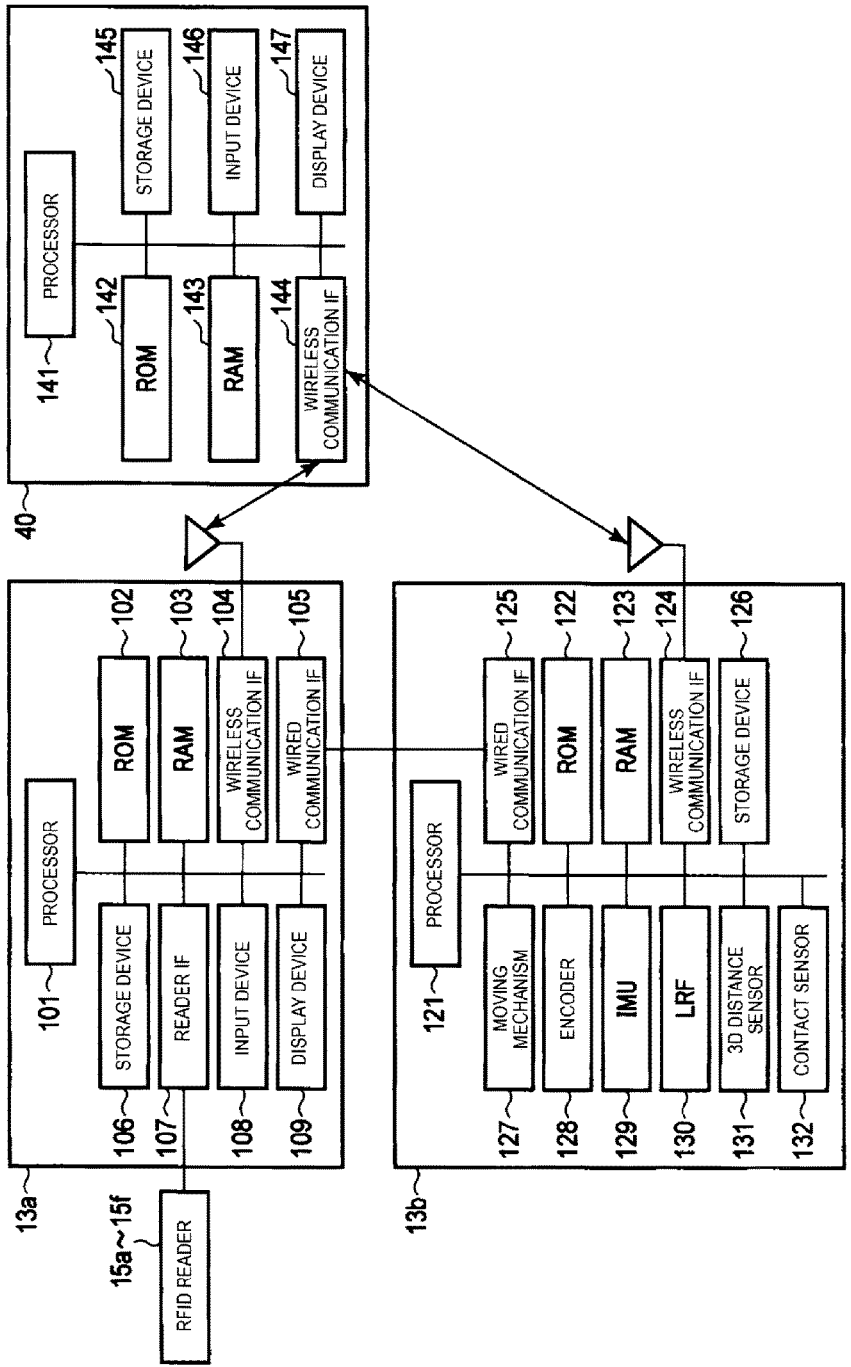
FIG. 5 is a block diagram illustrating an example of constitution of a control system of the information collecting system.

FIG. 5 is a view illustrating a constitution of the control system of the information collecting system. As shown in FIG. 5, the data processing device 13a and the movement control device 13b of the information collecting apparatus 1 can communicate with a server 40, which is an example of the host device. The information collecting apparatus 1 and the server 40 constitute the information collecting system. The server 40 is an information processing apparatus that processes data collected by the information collecting apparatus 1. The server 40 may perform a movement control for the information collecting apparatus 1.

In FIG. 5, the data processing device 13a includes a processor 101, a ROM 102, a RAM 103, a wireless communication interface (IF) 104, a wired communication interface (IF) 105, a storage device 106, a tag reader interface (reader IF) 107, an input device 108, a display device 109.

The processor 101 is, for example, a CPU. The processor 101 realizes various processing functions by executing programs stored in the ROM 102 or the storage device 106. The ROM 102 stores programs executed by the processor 101, control data, or the like. The RAM 103 functions as a working memory or a work area.

The wireless communication IF 104 is a communication unit for communicating with the server 40. For example, the processor 101 transmits the collected information to the server 40 via the wireless communication IF 104. The processor 101 receives information supplied from the server 40 via the wireless communication IF 104.

The wired communication IF 105 is an interface for establishing a communication connection with the movement control device 13b. For example, the processor 101 acquires data relating to the movement of the information collecting apparatus 1 via the wired communication IF 105. The processor 101 may send a movement request or the like to the movement control device 13b via the wired communication IF 105. The wired communication IF 105 may be an interface for being capable of communication with the movement control device 13b and may be an interface that wirelessly communicates with the movement control device 13b.

The storage device 106 is, for example, a rewritable nonvolatile memory. The storage device 106 includes an SSD (Solid-State Drive), or an HDD (Hard Disk Drive). The storage device 106 stores programs executed by the processor 101, control data, and the like. For example, the storage device 106 may store programs and data for executing respective processing described later. The storage device 106 stores data and the like collected by processing described later.

The reader IF 107 is an interface for communicating with the tag reader 15. The reader IF 107 may be connected to each tag reader 15 by a cable or may be connected to each tag reader 15 by an wireless communication interface such as a Bluetooth.

The input device 108 is an operation device for inputting instructions by a user. The display device 109 displays information. The input device 108 and the display device 109 may be constituted with a display device with a touch panel. If a user instruction to the information collecting apparatus 1 is not required, the input device 108 may be omitted. If the display of information in the information collecting apparatus 1 is also unnecessary, the display device 109 may be omitted.

As shown in FIG. 5, the movement control device 13b includes a processor 121, a ROM 122, a RAM 123, a wireless communication interface (IF) 124, a wired communication interface (IF) 125, a storage device 126, a moving mechanism 127, an encoder 128, an IMU (Inertial Measurement Unit) 129, an LRF (Laser Range Finder) 130, a distance sensor 131, a contact sensor 132.

The processor 121 is, for example, a CPU. The processor 121 realizes various processing functions by executing programs stored in the ROM 122 or the storage device 126. The ROM 122 is a nonvolatile memory that stores programs executed by the processor 121, control data, or the like. The RAM 123 is a volatile memory functioning as a working memory.

The wireless communication IF 124 is a communication unit for communicating with the server 40. For example, the processor 121 transmits data indicating a movement status, information detected by various sensors to the server 40 via the wireless communication IF 124. The processor 121 receives information supplied from the server 40 via the wireless communication IF 104.

The wired communication IF 125 is an interface for communicating with the data processing device 13a. For example, the processor 121 transmits data indicating the movement status and information detected by various sensors to the data processing device 13a via the wired communication IF 125. The processor 121 may acquire information such as a movement instruction from the data processing device 13a via the wired communication IF 125. The wired communication IF 125 may be an interface for performing communication with the data processing device 13a and may be an interface that wirelessly communicates with the data processing device 13a.

The storage device 126 is a rewritable nonvolatile memory. The storage device 126 includes, for example, an SSD or an HDD. The storage device 126 stores data indicating the movement status, information detected by various sensors, and the like. The storage device 126 may store programs executed by the processor 101, control data, and the like. For example, the storage device 126 may store programs and data for realizing the movement control described later.

The moving mechanism 127 is a mechanism for moving the case body 11. The moving mechanism 127 includes a motor for generating a driving force for rotating the wheels 12. The moving mechanism 127 also includes a mechanism for changing the moving direction of the case body 11. The moving mechanism 127 performs a movement of the case body 11 and a change of the moving direction according to an instruction from the processor 121.

The encoder 128 measures a rotation amount of the wheels 12. The IMU 129 detects, for example, angles or angular velocity and acceleration in directions of three axes. The LRF 130 is a distance meter that measures a distance by a laser. The 3D distance sensor 131 is a sensor for detecting distance and direction in the three dimensions. The contact sensor 132 is a sensor that detects a contact between an object and the contact sensor 132.

These sensors 128 to 132 acquire various kinds of information relating to the movement, such as information indicating the movement status or progress of the movement. The sensors 128 to 132 supply the acquired information to the processor 121. The processor 121 performs movement control of the case body 11 based on the information acquired from the sensors 128 to 132. For example, in the case of creating a map including a movement route for the autonomous-traveling by using the LRF 130, the LRF 130 notifies the processor 121 of measured distance information, the encoder 128 notifies the processor 121 of the rotation amount of the wheels 12 to be measured, and the IMU 129 notifies the processor 121 of rotation angle information. Based on these movement related information, the processor 121 performs an SLAM (Simultaneous Localization And Mapping) to create an accurate map. Thereafter, the LRF 130 notifies the processor 121 of the measured distance information, the encoder 128 notifies the processor 121 of information indicating the rotation amount of the wheels 12, and the IMU 129 notifies the processor 121 of the rotation angle information while the information collecting apparatus 1 performs the autonomous-traveling. The processor 121 performs the matching between the measured distance information of the LRF 130 and the map, and thus, the processor 121 accurately knows a current position and an orientation (posture and direction) of the case body based on the corrected and updated movement distance information by the encoder 128 and the IMU 129.

In FIG. 5, the server 40 includes a processor 141, a ROM 142, a RAM 143, a wireless communication interface (IF) 144, a storage device 145, an input device 146, a display device 147.

The processor 141 is, for example, a CPU. The processor 141 realizes various processing functions by executing programs stored in the ROM 142 or the storage device 145. The ROM 142 stores programs executed by the processor 141, control data, or the like. The RAM 143 functions as a working memory.

The wireless communication IF 144 is an interface for wireless communication. The wireless communication IF 144 is an interface for communicating with the data processing device 13a and/or the movement control device 13b. For example, the processor 141 receives information collected by the information collecting apparatus 1 from the data processing device 13a via the wireless communication IF 144. The processor 141 receives data indicating the movement status (progress of the movement) of the information collecting apparatus 1 and information detected by the respective sensors from the movement control device 13b via the wireless communication IF 144. The processor 141 may supply information such as an operation instruction to the data processing device 13a or the movement control device 13b via the wireless communication IF 144.

The storage device 145 is a rewritable nonvolatile memory. The storage device 145 includes, for example, an SSD, or an HDD. The storage device 145 stores data collected from the information collecting apparatus 1. The storage device 145 also stores information obtained as a result of the processing described later. The storage device 145 may store programs executed by the processor 141, control data, and the like.

The input device 146 is an operation device for inputting operation instructions. The display device 147 displays information. For example, the input device 146 and the display device 147 may be constructed by a display device with a touch panel. The server 40 may be provided with an interface for connecting with a printer for printing information on a medium such as a paper. The input device 146 and the display device 147 may be omitted according to the operation state. The server 40 may include a plurality of servers. For example, the server 40 may include a data processing server which communicates with the data processing device 13a, and a movement control server which communicates with the movement control device 13b.

In the present embodiment described above, the control device 13 is described as a device in which the data processing device 13a and the movement control device 13b are separately arranged. However, the control device 13 may be realized as a single device having the functions of both the data processing device 13a and the movement control device 13b. A part of the processing functions described later executed by the data processing device 13a and the movement control device 13b may be executed by the server 40. The data processing device 13a and the movement control device 13b may execute part or all of the processing functions described later executed by the server 40.

Figure 6:
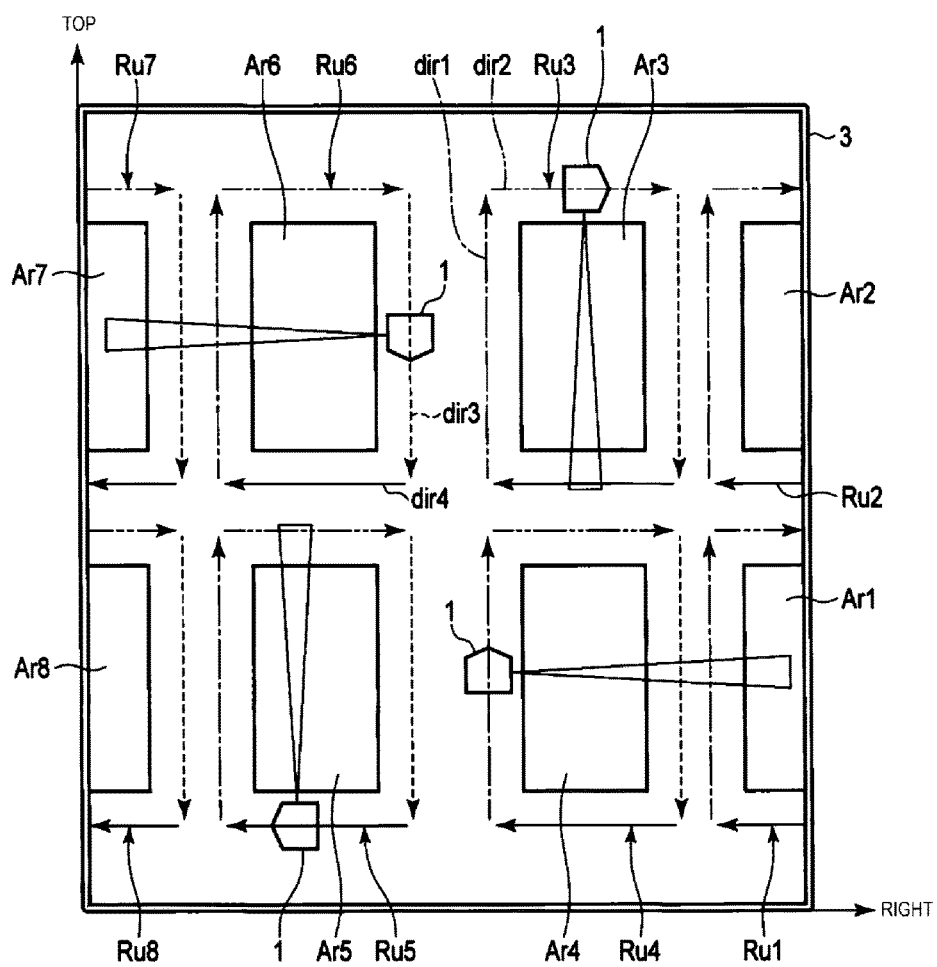
FIG. 6 is a view illustrating an example of search segment regions and a route for a search area of the information collecting system.

FIG. 6 is a view illustrating a plurality of segment regions Ar surrounded by a corresponding movement route Ru in the search area in which the information collecting apparatus 1 searches an article. In FIG. 6, there are eight segment regions Ar (Ar 1, Ar 2 . . . Ar 8) in the search area enclosed by the wall 3. For the segment regions Ar 8, corresponding movement routes Ru (Ru 1, Ru 2 . . . Ru 8) are established beforehand, respectively. Each movement route Ru is determined to surround a corresponding segment region Ar. Along the movement route Ru, the information collecting apparatus 1 moves such that the detection range 2 of each tag reader 15 thereof is oriented toward the segment region Ar. In each segment region Ar in contact with the wall 3, if the wall 3 is included in the detection range 2 of each tag reader 15, the wall 3 is electromagnetically shielded to ensure that tags located beyond or outside of the wall are not detected. In the present embodiment also, tags are not present beyond the wall within the detection range 2, or IDs of tags beyond the wall within the detection range 2 are known beforehand and can be excluded from IDs of the detected tags in each segment region.

In FIG. 6, the movement route Ru is formed by combining the route sections of four moving directions (Dir1, Dir2, Dir3, and Dir4) so that a rectangle segment region Ar is surrounded in a rectangle by the combined route sections. In the present embodiment, as shown in FIG. 6, the four directions Dir1, Dir2, Dir3, and Dir4 indicate an upward, a rightward, a downward, and a leftward directions, respectively. Specifically, the section Dir1 indicated by the dashed-dotted line in the movement route Ru is a section in which the case body 11 is moved from the bottom to the top while the tag is searched from the left side to the right side of the corresponding segment region Ar. The section Dir2 indicated by the two-dot chain line in the movement route Ru is a section in which the case body 11 is moved from the left to the right while the tag is searched from the top side to the bottom side of the corresponding segment region Ar. The section Dir3 indicated by the dotted line in the movement route Ru is a section in which the case body 11 is moved from the top to the bottom while the corresponding segment region Ar is searched from the right side to the left side. The section Dir4 indicated by the solid line in the movement route Ru is a section in which the case body 11 is moved from the right to the left while the corresponding segment region Ar is searched from the lower side to the upper side.

In the present embodiment described above, each movement route Ru is formed by a combination of sections in four moving directions as shown in FIG. 6. However, the movement route Ru may surround the segment region Ar with a combination of a plurality of sections in moving directions and is not limited to the route surrounding in a rectangle with the combination of the above-described four directions. For example, the movement route Ru may surround the segment region Ar with a triangle movement route in three directions. The movement route Ru may depend on the shape of the segment region Ar.

Figure 7:
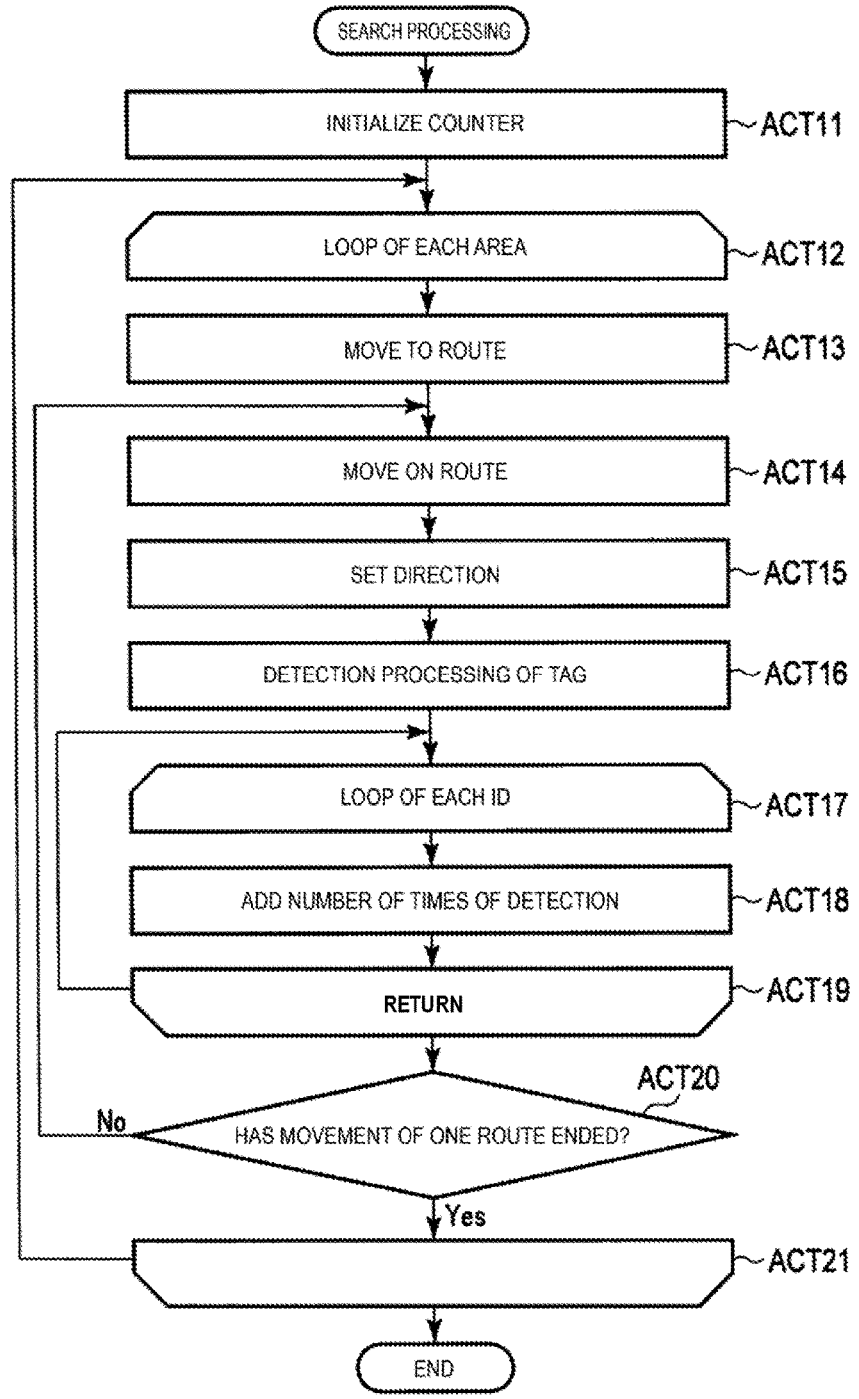
FIG. 7 is a flowchart of a search-related processing by the information collecting apparatus.

FIG. 7 is a flowchart of an RFID tag search processing (also referred to as information collection processing) by the information collecting apparatus 1. In the present embodiment described below, the operation is executed mainly by the processor 101. However, the operation may be also executed mainly by the processor 121. The operation may be executed mainly by the processor 141 of the server 40 by sending an operation instruction to the processor 101 or 121 of the control device 13.

First, the processor 101 initializes a counter for counting a number of times the tag is detected for each specific condition (ACT 11). The counter counts the number of times the tag is detected for each ID, detection direction, and an area. The counter registers, for example, Pos_count [id] [dir] [area]. Here, "id" is identification information (ID) read from the tag, "dir" is information indicating a tag detection direction, such as a section in the movement route Ru, and "area" is information indicating a segment region Ar. Thus, the Pos_count [id] [dir] [area] counts the number of times each tag ID is detected while moving each section of the movement route Ru corresponding to the segment region Ar.

When the counter is initialized, the processor 101 executes the search processing for each segment region (hereinafter, also simply referred to as an area) (ACT 12). The processor 101 sets one area to be searched and moves the case body 11 to a search start position in the movement route (hereinafter, also simply referred to as a route) of the area (ACT 13). For example, the processor 101 specifies information indicating a route corresponding to an area or an area to be searched for to the processor 121 and instructs the processor 121 to move to the specified route. The processor 121 identifies the search start position (coordinates) in the route specified by the processor 101. When the search start position is identified, the processor 121 executes movement control from the current position to the identified search start position. The search start position may be an arbitrary position on the route and, for example, is a certain position specified by the coordinates in each route, or is a position on the route closest to the current position.

When the case body 11 reaches the search start position, the processor 101 moves the case body 11 on the route (ACT 14). At the time of moving the case body 11, the processor 101 identifies a section on the route on which the case body 11 moves (ACT 15) and registers the section of the route as "dir" in the Pos_count. While moving the case body 11 on the route Ru, the processor 101 performs the detection processing of reading the ID from the tag (ACT 16). The processor 101 executes the detection processing of detecting the tag ID at a predetermined cycle while moving the case body 11. In the detection processing, the case body 11 is moved in each section of the route to search the entire segment region Ar from a predetermined direction.

When the detection process is executed, the processor 101 counts the IDs detected based on the detection result (ACTS 17-19). For example, the processor 101 increments the counter that sets "id" detected to the Pos_count in which the "dir" and the "area" are being set. For example, if detecting an ID "0001" while moving the first section (Dir 1) of the route Ru1 corresponding to the area Ar1, the processor 101 increments the counter (Pos_count[0001] [1] [1]).

Each time the processor 101 executes the detection processing, the processor 101 checks whether the movement of one route is completed (ACT 20). If the movement of one route is not completed (NO in ACT 20), the processor 101 returns to the processing in ACT 14 and executes the processing in ACTS 14-20 described above. On the other hand, if the movement of one route is completed (YES in ACT 20), the processor 101 ends the search processing if the above-described processing is completed for the routes corresponding to all the areas (ACT 21). If there is a route for which the search processing is not yet executed, the processor 101 executes the processing of the above-described ACTS 12-20 to the route to which the search processing is not yet executed.

Through the search processing described above, the information collecting apparatus detects the tag from the route set for each segment region in the search area to collect detection information. The detection information includes information, such as detection information, Pos_count [id] [dir] [area], obtained by counting the number of times the tag is detected for each ID, tag detection direction "dir," and segment region "area".

Next, a sort processing for aggregating the detection information is described. The detection information obtained by the search processing is aggregated for each segment region by the sort processing. In the sort processing, the number of times each ID is detected in each segment region is aggregated for each ID. In the present embodiment, the server executes the sort processing based on the detection information supplied from the information collecting apparatus 1. However, the sort processing may be performed by the information collecting apparatus 1. In this case, the information collecting apparatus 1 also includes a function, otherwise realized by the server 40, acting as an information processing apparatus described later.

Figure 8:
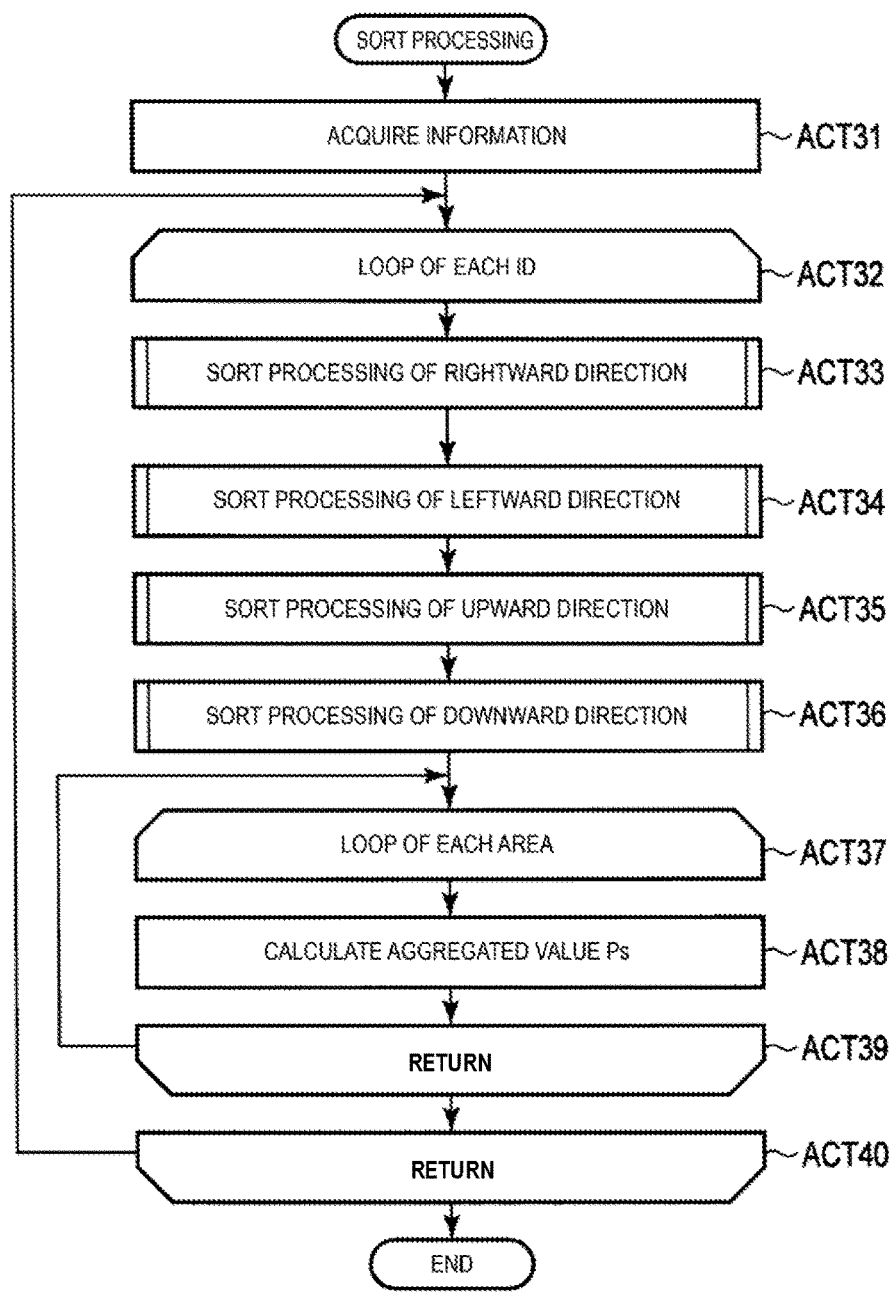
FIG. 8 is a flowchart of a sorting processing by the information collecting system.

FIG. 8 is a flowchart of the sort processing by the server 40. The processor 141 of the server 40 acquires detection information from the information collecting apparatus 1 (ACT 31). The detection information includes information of the counter (Pos_count [id] [dir] [area]) that the information collecting apparatus 1 obtains in the search processing described above.

When the detection information is acquired, the processor 141 executes the sort processing for each ID for all the IDs (ACT 32). The processor 141 sets an ID to be sorted (target ID) and executes the sort processing in each direction for the target ID (ACTS 33-36). In the present embodiment, the detection direction of the tag Dir1 is a rightward direction, the detection direction of the tag Dir2 is a downward direction, the detection direction of the tag Dir3 is set as a leftward direction, and the detection direction of the tag Dir4 is an upward direction. Sort processing in each direction (ACTS 33-36) may be performed in any order.

As shown in FIG. 8, the processor 141 performs a rightward direction sort processing in which the number of detections of the tag performed in the rightward direction Dir1 is sorted (ACT 33). The processor 141 extracts the value of the counter of the target ID fixed in the rightward direction Dir1 and identifies the rightmost area. That is, in the sort processing in the rightward direction, the processor 141 extracts a counter (Pos_count [target ID] [dir1] [area]) of each area in the rightward direction Dir1 for each target ID to be sorted. The processor 141 specifies the counter of the rightmost area from the counter that is Pos_count [target ID] [dir1] [area]>0. Thus, the processor 141 specifies Pos_count [target ID] [dir1] [rightmost area]>0.

When the rightmost area is identified, the processor 141 initializes (sets to 0) a count value (Pos_count [target ID] [dir1] [area to the left of the rightmost area]) of the area at the left side of the rightmost area. Depending on the positional relationship of each segment region, there is a possibility that the rightmost area is plural. In such a case, the processor 141 may select a plurality of rightmost areas.

The processor 141 then performs a leftward sort processing in which the number of detections of the tag performed in the leftward direction Dir3 is sorted (ACT 34). The sort processing in the leftward direction is a processing in which the rightward direction and the leftward direction are exchanged in the rightward direction sort processing described above. That is, the processor 141 fixes the leftward direction Dir3 and identifies the leftmost area among the areas in which the target ID is detected. The processor 141 leaves the value of the counter in the leftmost area and initializes the value of the counter of the right area with respect to the leftmost area.

The processor 141 performs an upward sort processing of sorting the number of detections performed in the upward direction Dir4 for the detection method of the tag (ACT 35). The upward sort processing is a processing in which the rightward direction is replaced by the upward direction and the leftward direction is by the downward direction in the rightward sort processing described above. In other words, the processor 141 fixes the moving direction to the upward direction Dir4 and identifies the uppermost area among the areas in which the target ID is detected. The processor 141 leaves the value of the counter in the uppermost area and initializes the value of the counter in the lower side area with respect to the uppermost area.

The processor 141 performs a downward sort processing of sorting the number of detections performed in the downward direction Dir2 (ACT 36). The downward sort processing is a processing in which the rightward direction is replaced by the downward direction and the leftward direction is by the upward direction in the rightward sort processing described above. The processor 141 fixes the moving direction in the downward direction Dir2 and identifies the lowermost area among the areas in which the target ID is detected. The processor 141 leaves the value of the counter in the lowermost area and initializes the value of the counter in the upper area with respect to the lowermost area.

When the sort processing in each direction is completed, the processor 141 aggregates the counters for each segment region and calculates an aggregate value Ps for each segment region for the target ID (ACTS 34-39).

Every time the aggregation for one ID is completed, the processor 141 checks whether or not the aggregation for all the IDs is ended (ACT 40). If there is an uncalculated ID, the processor 141 returns to the processing in the above-described ACT 32 and executes the processing in ACTS 32-39 to the uncalculated ID. In a case in which the aggregation for all the IDs is completed, the processor 141 ends the sort processing.

According to the sort processing as described above, by sorting in each direction, the detection result of tags located outside the segment region corresponding to the search route can be eliminated from that in the search processing. Furthermore, according to the above-described sort processing, an aggregated value of the number of times the target ID is detected for each sort processing can be obtained.

Figure 9:
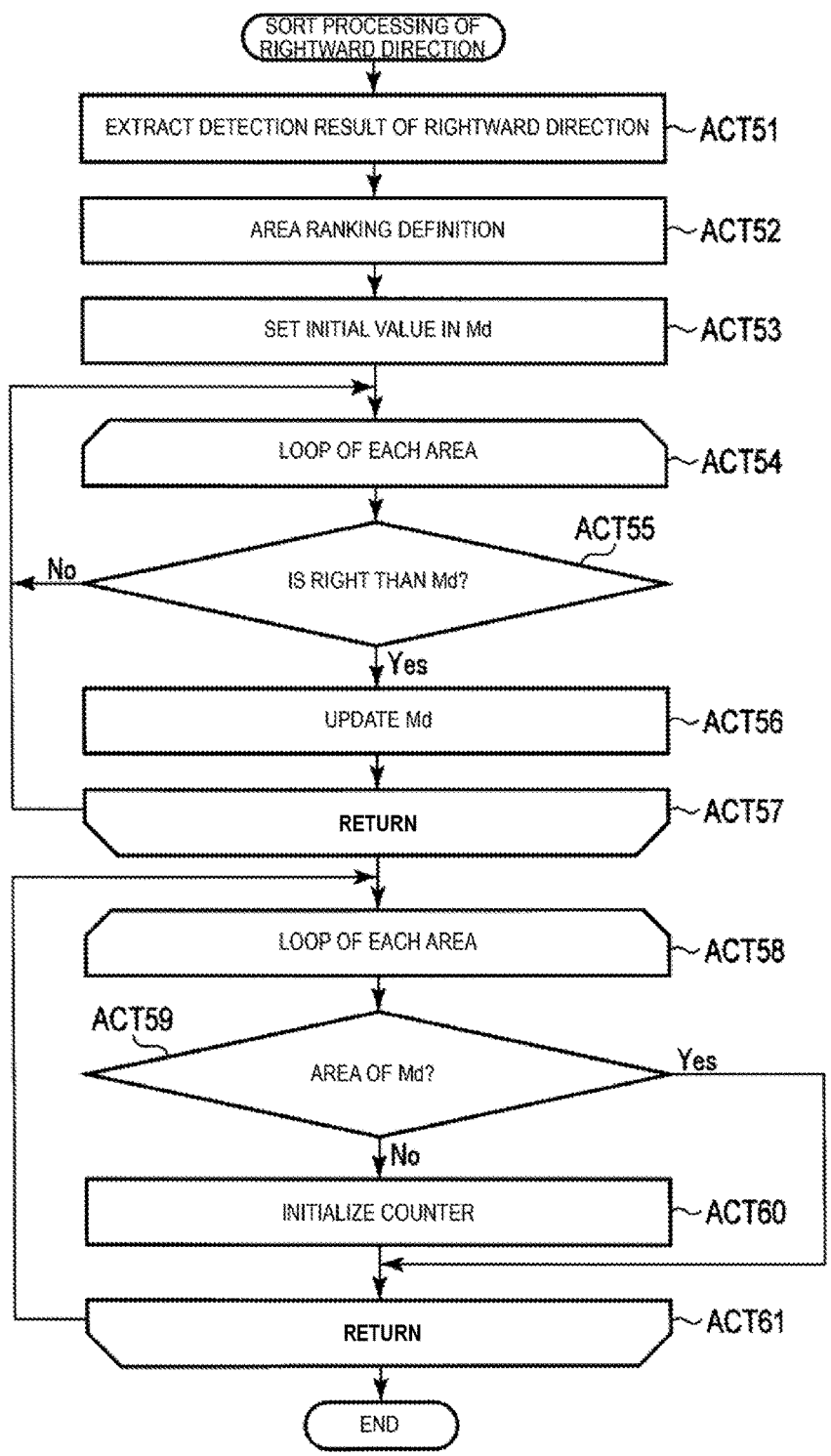
FIG. 9 is a flowchart of a sorting processing in a specific direction by the information collecting system.

FIG. 9 is a flowchart of an operation of a rightward sort processing as an example of sort processing in a specific direction. As a sort processing in the rightward direction, the processor 141 extracts the value of the counter in the rightward direction Dir1 for the target ID (ACT 51). For example, the processor 141 extracts Pos_count [target ID] [dir1] [area]>0. The processor 141 defines an area ranking definition (Pos_order [right] [area]) defining an area located at the right side in the rightward sort processing (ACT 52). As the area ranking definition, the area located at the rightmost position is set to a value 0, and ascending order values are sequentially set to areas in order of being positioned at the left side.

If the area ranking definition is set, the processor 141 defines a variable (max dir: Md) and sets, as an initial value, the maximum value that the area ranking definition can take, i.e., the value located at the leftmost position, in the variable Md (ACT 53). After setting the initial value to the variable Md, the processor 141 performs a variable (Md) update processing for each segment region (ACTS 54-57). The processing in ACTS 54-57 is a processing of determining the rightmost area in which the ID is detected.

The processor 141 checks whether or not the count value (Pos_count [target ID] [dir1] [area])>0 and the area ranking definition (Pos_order [right] [area]) Md for each area (ACT 55). If the count value>0 and the ranking definition Md (YES in ACT 55), the processor 141 sets the area ranking definition in the variable Md.

If updating the variable Md for all segment regions is completed (ACT 57), the processor 141 initializes the value of the counter in the area at the left side of the rightmost area (ACTS 58-61). This processing is performed to initialize the value of the counter that counts the number of times the tags located outside the segment region (search region) is detected.

The processor 141 checks whether or not (Pos_order [right] [area]) is equal to the variable Md for each segment region (ACT 59). If (Pos_order [right] [area]) is not equal to the variable Md in one segment region (NO in ACT 59), the processor 141 initializes the value of the counter of the area (ACT 60). The processing in ACT 59 is performed to check whether the area which is targeted is the rightmost area. If it is determined that the area which is targeted is not the rightmost area, then the processor 141 initializes the value of the counter of the area as described above.

According to the sort processing in the right direction as described above, the value of the counter that counts the number of detections performed in the rightmost area for each ID is validated, and the value of the counter that counts the number of detections performed in the area at the left side of the rightmost area is initialized. As a result, the detection result of the tags located outside the segment region subject to the searching can be eliminated. The sort processing in the rightward direction is described according to FIG. 9, but the sort processing in the leftward direction, upward direction, and downward direction can also be realized by the same processing procedure as the processing shown in FIG. 9.

Next, a region estimation processing of estimating the region in which the tag is present based on an aggregation result by the sort processing is described. According to the above-described sort processing, aggregated values obtained by aggregating the number of detections performed for each segment region for each ID are obtained as the aggregation result. In the present embodiment, the server 40 executes the region estimation processing of estimating the region in which the tag of each ID is present based on the aggregation result of the sort processing. However, the sort processing may be performed by the information collecting apparatus 1.

Figure 10:
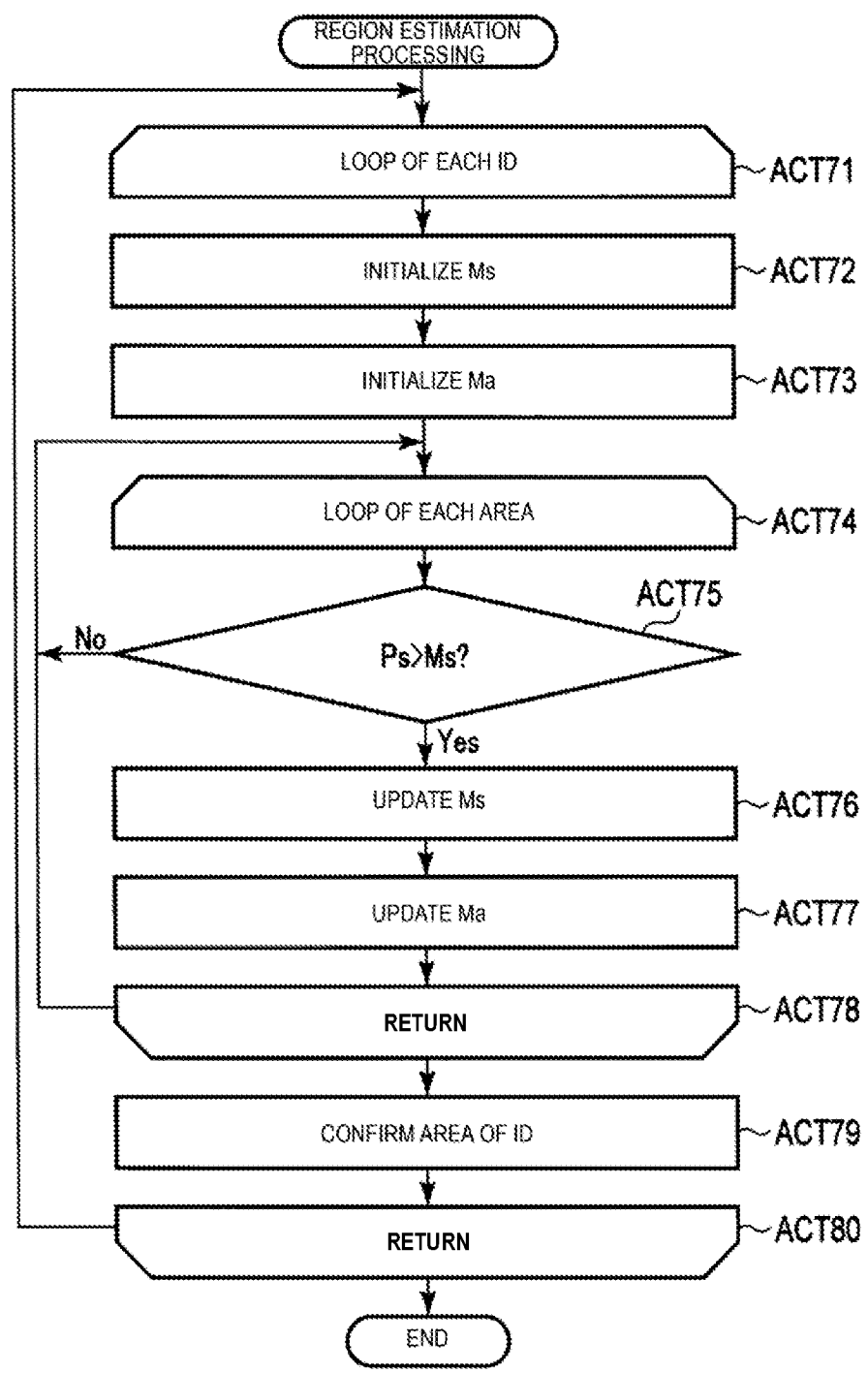
FIG. 10 is a flowchart of a region estimation processing by the information collecting system.

FIG. 10 is a flowchart of a region estimation processing by the server 40 according to the present embodiment. The processor 141 of the server 40 executes processing of estimating the region for each detected ID (ACTS 71-80). First, the processor 141 defines a variable Ms (max sum) and initializes the variable Ms (0 Ms) (ACT 72). The processor 141 defines a variable Ma (max area) and sets an initial value (−1) to the variable Ma (ACT 73).

The processor 141 sets initial values to the variables Ms and Ma as described above, and then executes processing of identifying an area having the largest aggregated value (the number of detections performed) for the target ID (ACTS 74-78). The processor 141 checks whether an aggregated value (pos_sum [id] [area]) is greater than the variable Ms for each area (ACT 75). If the aggregated value is greater than the variable Ms, the processor 141 sets the aggregated value (pos_sum [id] [area]) of the area in the variable Ms (ACT 76) and sets the area in the variable Ma (ACT 77).

After executing the processing in ACTS 75-77 for all the areas, the processor 141 estimates the area set in the variable Ma as the segment region (area) in which the target ID is present (ACT 79).

Every time a segment region for one ID is estimated, the processor 101 checks whether or not the aggregation for all the IDs is ended (ACT 80). If there is an ID for which the segment region is not yet estimated, the processor 141 returns to the processing in ACT 71 and executes the processing in ACTS 71 to 79 for IDs for which the region estimation processing is not yet executed. If the estimation of the segment regions for all the IDs is completed, the processor 141 ends the region estimation processing. As a result of the region estimation processing as described above, the processor 141 obtains information indicating the segment region in which the tag of each detected ID is present.

Figure 11:
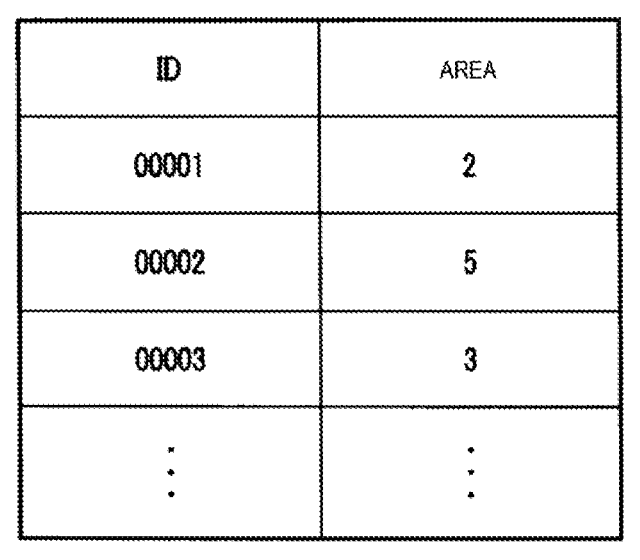

FIG. 11 is a table illustrating the result of a region estimation processing. In FIG. 11, the segment region estimated in association with the ID is shown. The processor 141 of the server 40 saves the segment region estimated in association with the ID in the storage device 145. The processor 141 may display the result of the region estimation processing as shown in FIG. 11 on the display device 147. The processor 141 may provide the result of the region estimation processing to the information collecting apparatus 1 or other apparatuses. The processor 141 may record the result of the region estimation processing on a medium such as a paper by a printer.

According to the information collecting system as described above, the information collecting apparatus moves along the route set for each of the plurality of segment regions in the search area to detect the presence or absence of a tag in each segment reason. An information processing apparatus, such as a processor of the server or the information collecting apparatus, acquires detection information indicating the result in which the information collecting apparatus detects the tag. The information processing apparatus aggregates the number of times a particular tag is detected while moving along the route for each segment region from the detection information. The information processing apparatus estimates the segment region in which the tag is present based on the aggregated value obtained by aggregating the number of detections of the tag for each segment region.

As a result, the information collecting system can reliably identify the segment region in which the article is present without depending on the intensity of radio waves, which is adversely affected by posture of the tag (orientation and location). According to the present embodiment, it is unnecessary to determine the intensity of the radio waves with high accuracy or calculate a distance based on the intensity of the radio waves, but the segment region in which the article is present can be identified based on the result of the detection (presence of the tag). According to the present embodiment, the segment region can be set to an arbitrary size corresponding to the route setting, and thus a system having a high versatility can be provided.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information collecting apparatus, comprising:
   a plurality of tag readers disposed on the apparatus, each respective tag reader in the plurality of tag readers being configured to detect a wireless tag attached to an article located within a detection range of the respective tag reader;
   a movement controller configured to control movement of the apparatus within a search area along a plurality of routes, each route enclosing a different segment region of the search area; and
   a data processor configured to:
      acquire tag detection information of the wireless tag during a time in which the apparatus is moving in a particular route enclosing each segment region, the tag detection information including a number of times the wireless tag is detected while the apparatus moves along the particular route,
      aggregate the number of times for which the wireless tag is detected during the time in which the apparatus is moving along the particular route, and
      identify a particular segment region in which the wireless tag is present based on the aggregated number of times for which the wireless tag is detected.

2. The information collecting apparatus according to claim 1, wherein the tag detection information further includes:
   tag identity information stored in the wireless tag;
   a route identification for identifying the particular route along which the apparatus was moving when the tag identity information is acquired; and
   a segment region identification for identifying the particular segment region enclosed by the particular route.

3. The information collecting apparatus according to claim 2, wherein the plurality of tag readers faces toward a segment region when the apparatus moves along a route.

4. The information collecting apparatus according to claim 1, wherein
   each route of the plurality of routes includes a plurality of route parts extending in different directions, and
   the data processor stores a number of times the wireless tag is detected while the apparatus moves along each respective route part.

5. The information collecting apparatus according to claim 1, further comprising:
   a case body;
   wheels on the case body; and
   a moving mechanism configured to rotate the wheels.

6. The information collecting apparatus according to claim 5, wherein the moving mechanism is a motor.

7. An information collecting apparatus, comprising:
   a case body;
   wheels on the case body;
   a moving mechanism configured to rotate the wheels;
   a support body attached to the case body;
   a plurality of tag readers attached to the support body, each respective tag reader in the plurality of tag readers being configured to detect a wireless tag attached to an article located within a detection range of the respective tag reader;
   a movement controller configured to control movement of the apparatus within a search area along a plurality of routes, each route enclosing a different segment region of the search area; and
   a control device on the case body, the control device configured to:
      acquire tag detection information of the wireless tag during a time in which the apparatus is moving in a particular route enclosing each segment region, the tag detection information including a number of times the wireless tag is detected while the apparatus moves along the particular route,
      aggregate the number of times for which the wireless tag is detected during the time in which the apparatus is moving along the particular route, and
      identify a particular segment region in which the wireless tag is present based on the aggregated number of times for which the wireless tag is detected.

8. The information collecting apparatus according to claim 7, wherein the tag detection information further includes:
   tag identity information from the wireless tag;
   a route identification for identifying the particular route along which the apparatus was moving when the tag identity information was acquired; and
   a segment region identification for identifying the particular segment region enclosed by the particular route.

9. The information collecting apparatus according to claim 8, wherein the plurality of tag readers faces toward a segment region when the apparatus moves along a route.

10. The information collecting apparatus according to claim 7, wherein
    each route of the plurality of routes includes a plurality of route parts extending in different directions, and
    the control device stores a number of times the wireless tag is detected while the apparatus moves along each respective route part.

11. The information collecting apparatus according to claim 7, wherein the moving mechanism is a motor.

12. The information collecting apparatus according to claim 7, wherein the plurality of tag readers is aligned in a row in a first direction that is perpendicular to a second direction along which the case body moves.

* * * * *